Oct. 16, 1956

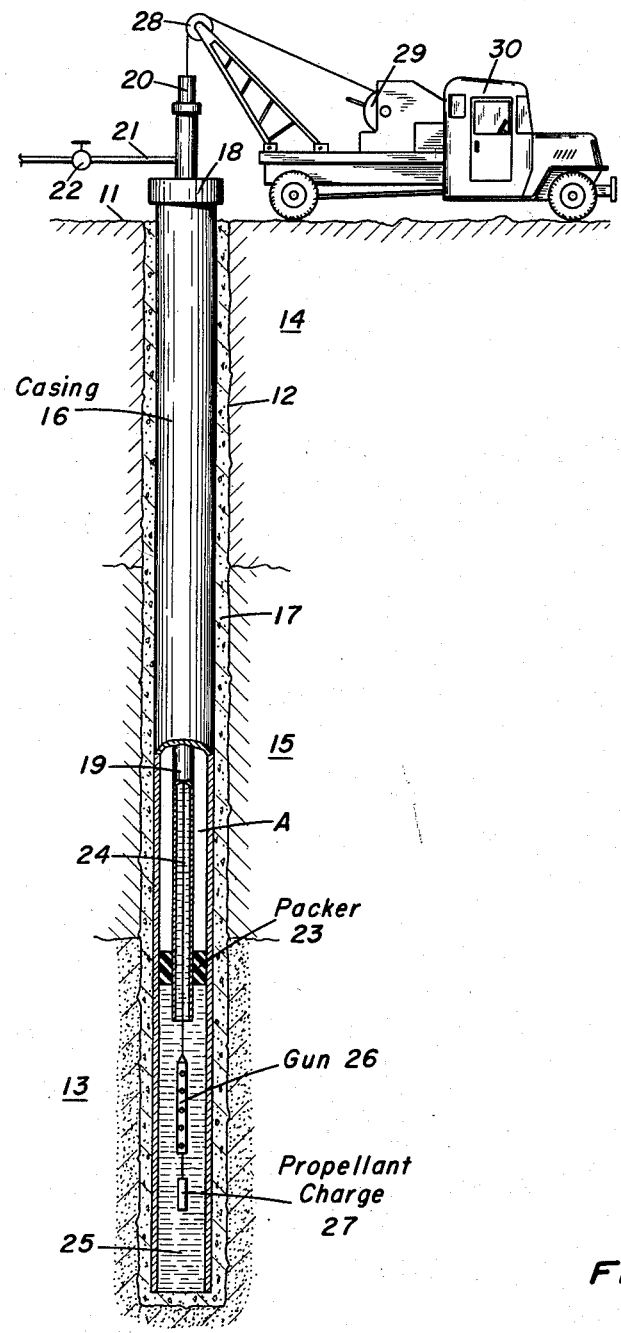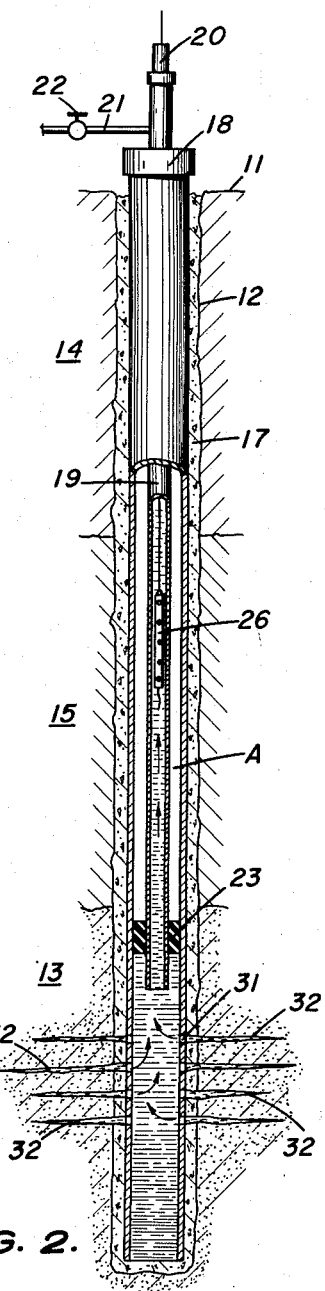
FIG. 1.
FIG. 2.
INVENTOR.
Henry H. Rachford Jr.,
BY
ATTORNEY.

H. H. RACHFORD, JR 2,766,828

FRACTURING SUBSURFACE FORMATIONS AND WELL STIMULATION

Filed July 20, 1953

INVENTOR.
Henry H. Rachford Jr.,
BY

ATTORNEY.

United States Patent Office 2,766,828
Patented Oct. 16, 1956

2,766,828

FRACTURING SUBSURFACE FORMATIONS AND WELL STIMULATION

Henry H. Rachford, Jr., Houston, Tex., assignor, by mesne assignments, to Esso Research and Engineering Company, Elizabeth, N. J., a corporation of Delaware Application July 20, 1953, Serial No. 369,128

7 Claims. (Cl. 166—36)

The present invention is directed to a method for increasing the permeability of a low permeability subsurface earth formation. In its more particular aspects, the invention is concerned with fracturing a low permeability subsurface earth formation. In its more specific aspects, the invention is directed to a method for fracturing a subsurface earth formation without applying pump pressure for the fracturing operation.

The present invention may be briefly described as a method for fracturing a low permeability subsurface earth formation penetrated by a well in which a fracturing liquid is introduced into the well adjacent a point in the well traversing the earth formation. A body of a propellant is arranged in the fracturing liquid adjacent or in the vicinity of said earth formation and the propellant is then reacted in the fracturing liquid to generate a pressure sufficient to fracture the formation. The reaction of the propellant then forces the fracturing liquid into the earth formation by virtue of the pressure to form fractures in the earth formation. It is contemplated that after the fractures have been formed the fracturing liquid may be pumped into the formation. It is contemplated within the scope of this invention to remove at least a portion of the fracturing liquid from the well to cause fluid in the formation of flush fracturing liquid from the fractured formation and then produce desirable earth fluids, such as oil, gas, water, and the like, from the formation which has been fractured.

The present invention may be conducted in an open hole or in a casing. When the invention is performed in a cased well, it will be necessary first to perforate the casing and then react the propellant in the perforated casing to force the fracturing liquid through the perforations into the formation to fracture same. To this end, I may arrange in the fracturing liquid in the casing a suitable perforator, such as a gun perforator, and a body of a propellant adjacent the point in the well casing to be perforated and the formation to be fractured. The perforator is operated to cause perforations and the propellant is then caused to react to force the fracturing liquid through the perforations to fracture the formation.

The fracturing liquid employed in the practice of the present invention may be a low viscosity liquid. Sand or gravel may be mixed with the fracturing liquid to act as a propping agent to assist in maintaining channels of flow after the fracturing of the formation has taken place.

As a liquid suitable for use in fracturing formations in accordance with my invention may be mentioned oil, water and dilute hydrochloric acid. If acid is used it may react chemically with the formation to enlarge the fissures thereof while it is being injected into the formation or thereafter. Oil is sometimes deemed more preferable for fracturing liquids since it does not contaminate oil bearing rock as does water and the viscosity of the oil may be easily controlled by mixing with a suitable soap. When sand or gravel are mixed with the fracturing liquid, the liquid should have sufficiently high viscosity to suspend the particles of the sand or gravel uniformly. While liquids of reasonably high viscosity may be employed, in no event should the viscosity of the liquid be so high that the formation may become clogged after it has been fractured with the fracturing liquid. The fracturing liquid may be a gel and may be described as involving a mixture of heavy metal soaps with hydrocarbons, such as fuel oil, crude oil and lighter fractions of crude petroleum. As pointed out, the fracturing liquid or gel may have added to it, finely divided material, such as sand and the like, to act as a propping agent and to provide, if desired, weight to the fracturing liquid.

The acid fracturing liquid may be a gel acid, such as gels prepared with Napalm and kerosene or crude oil, and, if desired, containing a propping agent such as sand. Other suitable materials which may be employed include the plastic group of organic compounds which have the property of reverting to a non-viscous condition through the action of chemicals which may be added during the preparation of the fracturing liquid or may break automatically with time or with adjustment of temperature and pressure. French Patent No. 987,352, granted April 11, 1951, sets out in detail many fracturing liquids which will fill my requirements as set out above. For example, in the French patent supra it is mentioned that polymers, plasticizers soluble in petroleum or water, such as oxidized resins or bitumen, may be used and also natural or synthetic rubber as well as the resins such as polyacrylates. Mention is also made in the French patent supra of many heavy metal soaps which may be used in the formation of such gels. It is desirable in the practice of this invention that the fracturing liquid contain the propping agent to maintain the fractures in an open condition after they have been formed.

The propellant employed in the practice of the present invention is suitably a non-detonating chemical. For example, the propellant may be black powder composed of 75% potassium nitrate, 15% charcoal and 10% sulfur. The propellant may suitably be a propellant having the following approximate composition:

| | Percent |
|---|---|
| Nitrocellulose (13.25% nitrogen) | 58.6 |
| Nitroglycern | 38.9 |
| Diethyl-diphenyl urea | 1.0 |
| Diphenyl amine | 0.2 |
| Solvent | 1.3 |

Propellants having an approximate composition of about 75% potassium perchlorate and 25% asphalt may also be used in my invention. As examples of other propellants may be mentioned a mixture of 90% hydrogen peroxide plus hydrocarbons or other combustible material. A saturated solution of sodium dichromate plus hydrocarbons or other combustible material is also suitable. Saturated solutions of sodium tetrachromate plus hydrocarbons or other combustible material may also be used. A mixture of perchloric acid plus hydrocarbons may be suitably used as a propellant in my invention. When using sodium dichromate it must be pointed out that the solubility of sodium dichromate at 83° C. is 417 grams per 100 grams of water while the sodium tetrachromate is much greater than that of the sodium dichromate. Besides the chemicals listed above, crystalline materials such as potassium perchlorate and potassium permanganate may be made to react with liquids such as hydrocarbons, aniline, carbon bisulfide and the like to accomplish the fracturing of formations by pressure generated by the reaction.

The propellants composed of potassium nitrate, charcoal and sulfur and those containing potassium perchlorate and asphalt, and the propellants comprised of nitrocellulose, nitro-glycerine and other components may be ignited by means of a percussion cap actuated by a wire line extending to the earth's surface through the well, Excepting the perchloric acid an ignition charge is necessary to initiate the reaction of the chemicals suitable for use as propellants in the present invention.

The reaction of the chemicals may suitably be initiated by igniting an explosive charge such as a percussion cap by manipulation of the wire line. Many means are known for using such ignition charges and percussion caps, and it is intended to be within the scope of my invention to employ such means. For example, a jerk on the wire line may pull a release pin which will cause the ignition charge to initiate the reaction, or a weight may be dropped on the wire line to ignite a percussion cap. Also the charge may be ignited by using an ampoule of acid to dissolve a metal barrier and allow the ignition charge to be ignited.

The present invention may be suitably practiced by employing oil containing a suspension of a propping agent such as sand and introducing into the oil perchloric acid which reacts therewith and to generate pressure which may be exerted against the formation to fracture same.

The present invention will be further illustrated by reference to the drawing in which Fig. 1 is a diagrammatic view illustrating a well penetrating an earth formation to be fractured prior to the fracturing operation;

Fig. 2 illustrates the well after the fracturing operation;

Figure 3:
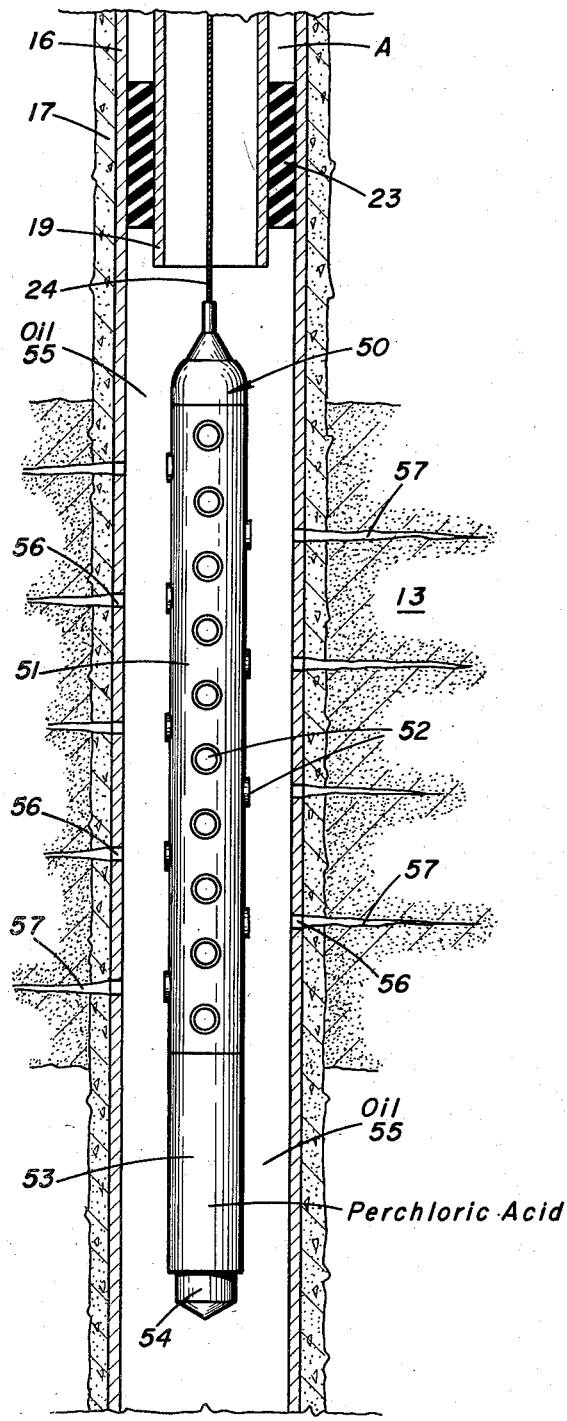
Fig. 3 illustrates one type of apparatus which may be suitably used in the practice of the present invention.

Referring now to the drawing and particularly to Figs. 1 and 2, numeral 11 designates the earth's surface and numeral 12 designates a well which penetrates an earth formation 13 which is to be fractured in accordance with the present invention. Earth formation 13 is overlaid by earth strata 14 and 15 which may not be productive of desirable fluids. Well 12 is provided with a casing 16 which is suitably sheathed and sealed in the well by means of cement 17. The casing 16 extends to the earth's surface and the well is covered with a closure member 18. Arranged in the casing 16 is a tubing string 19 which extends above the member 18 and which is provided with a stuffing box 20. The tubing 19 has a lateral conduit 21 provided with a valve 22 for introduction of fracturing fluid into the well and for withdrawing fracturing fluid and formation fluid, such as oil, from the well. The annulus A between the tubing 19 and the casing 16 is sealed off in the well 12 where it traverses the formation 13 with a packer 23 which may be a packer of the conventional type, such as illustrated in the 1951 edition of Composite Catalogue, page 4830. The packer 23 isolates the upper portion of the well 12 from the lower portion thereof. Suspended in the tubing 19 by means of a wire line 24 in a body of fracturing liquid 25, which is introduced by conduit 21, is a casing perforator 26 which may suitably be a gun perforator below which is carried, by the gun perforator 26, a body of a propellant charge 27. The wire line 24 is carried over a sheave 28 to a wire line drum 29 arranged on a service truck 30.

Referring now to Fig. 2 it will be seen that the gun perforator 26 has been operated to perforate the casing 16 and to form perforations 31 extending through the cement 17 and into the formation. On operating the gun perforator either simultaneously or immediately thereafter the propellant charge 27 is reacted by a suitable percussion cap or the like to create a pressure in the body of fracturing liquid. This pressure is exerted through the perforations 31 against the formation 13 and results in the formation being cracked or fractured to form fractures such as lateral fractures 32 in the formation 13, the propellant charge being suitably sized to cause generation of a sufficient amount of pressure to exceed the weight of the overburden of the formations 14 and 15 and cause lifting of the formations to allow fracturing of the formation 13 as has been described. Thereafter the fracturing liquid may be pumped into the fractures 32 to allow the propping agent to maintain the fractures 32 in their open condition and to provide channels of flow. The fracturing liquid may then be flowed outwardly from the tubing 19 to the conduit 21 to allow the formation fluids in formation 13 to flow into the well 12 as indicated by the arrows in Fig. 2.

As stated before, the method may suitably be used in a cased well or open hole.

Referring now to Fig. 3, a tubing, such as 19, is arranged in a casing 16 in a well 12 and the casing 16 being sheathed with cement 17. A packer, such as 23, isolates the lower portion of the well from the annulus A. A combination gun perforator and charge of propellant is arranged in a body member 50, the upper section of which is a gun perforator 51 having a plurality of gun barrels 52 while the lower section is provided with a chamber 53 constructed of polytetrafluoroethylene, commonly called Teflon, in which perchloric acid is arranged. The lower end of the section 53 is provided with an explosive charge or cap 54 which serves to release the perchloric acid from the section 53 as will be described. As will be seen, the combination gun perforator and propellant charge 50 is lowered on a wire line or cable 24 in the tubing 19 adjacent the formation 13 which is to be penetrated and fractured. The gun barrels 52 are fired and thereafter or simultaneously therewith the explosive charge 54 is ignited to rupture the chamber 53 and release perchloric acid into the well. Prior to the lowering of the combination gun perforator and propellant charge into the well a body of the fracturing liquid comprised principally of hydrocarbons, such as oil, has been pumped into the well adjacent the formation 13 below the packer 23. This body of fracturing liquid may suitably be an oil containing a propping agent generally indicated by numeral 55. When the perchloric acid is released into the body of oil a reaction takes place which generates a sufficient amount of pressure to force the fracturing liquid through the perforations 56 which result from firing the gun barrels 52. This causes the formation 13 to be fractured, as generally indicated, with fractures 57. Thereafter a portion of the fracturing liquid may be removed and the combination gun perforator 50 raised to the earth's surface by means of wire line or cable 24. After the fracturing liquid has flowed at least in part from the fractures 57 oil may be produced therefrom and brought to the earth's surface through the tubing 19.

Figure 4:
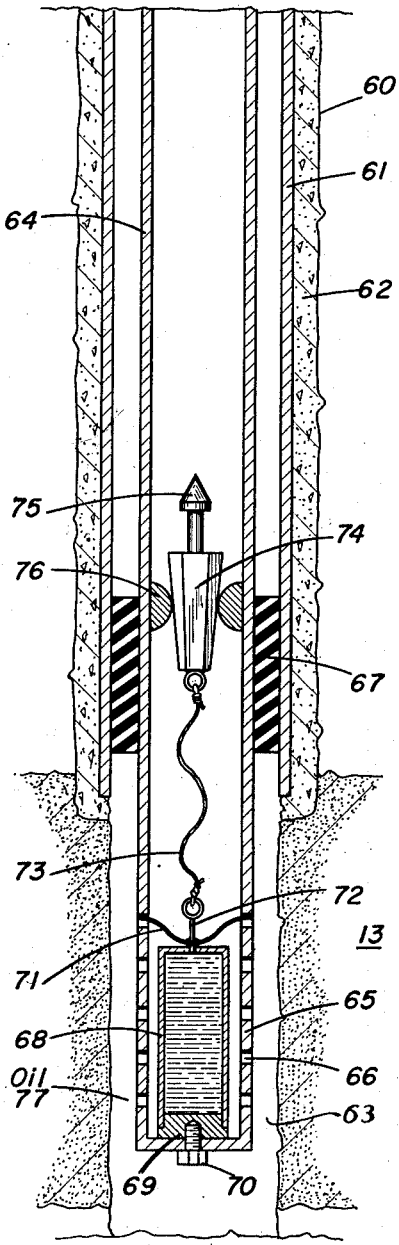
Fig. 4 shows a different type of apparatus for introducing a propellant into the well for initiating the reaction.

In Fig. 4 an operation is described wherein a propellant is caused to react in an open hole below the casing. To this end a well 60 in which is arranged a casing 61 which is cemeneted in place with cement 62 extends to above the open hole section 63 which may be in the formation 13 to be fractured. A pipe such as a tubing 64 having a perforated end section 65 provided with perforations 66 is lowered into the hole section 63 which is sealed off from the upper section of the well by means of a packer 67 of the type illustrated before. The tubing 64 has arranged within it a body member 68 which is suitably constructed of Teflon and which is filled with perchloric acid. The container 68 is closed at its lower end with a stopper 69 also constructed of Teflon which is held in the perforated section 65 of the tubing 64 by means of a threaded bolt 70.

The container 68 is held from vertical movement by means of a hold-down spring 71 having attached thereto a pin 72 which is also attached to container 68. Pin 71 is connected by means of piano wire or the like 73 which is connected in turn to a retrievable cage 74 which is provided with a fishing neck 75. The cage 74 is arranged in the tubing 64 before lowering same in the well on bumpers 76 and may be retrieved therefrom by engagement of the fishing neck 75 with a suitable fishing tool.

Prior to lowering the tubing 64 in the well 60, a body of oil containing a propping agent generally indicated as 77 has been arranged in the well adjacent the formation 13. When it is desired to fracture the formation 13, the fishing neck 75 is engaged and an upward pull on the spring 71 causes the chamber 68 to be removed from the plug 69 which releases the perchloric acid and allows it to come into contact with the oil which results in a reaction which generates a pressure sufficient to fracture the formation 13. Thereafter the fracturing liquid may be removed and production, such as oil, had from the fractured formation 13.

With respect to the mode illustrated in Figs. 1 and 2, suitable operations may be performed excepting that the operations may be conducted in the open hole rather than in the casing. In these instances, the casing gun may or may not be used and the fracturing liquid would be spotted adjacent the formation in the open hole and the desired amount of propellant reacted to generate a sufficient amount of pressure to flush the fracturing liquid into the formation and to fracture same.

The present invention has numerous advantages and wide utility in that it is unnecessary to employ high pump pressures to fracture formations as was necessary heretofore. Fracturing will be accomplished without undue delay, such as in pumping, by the reaction of the propellant. The exertion of the pressure by the propellant will produce more extensive and more numerous fractures than was possible heretofore. Furthermore by virtue of employing a propellant of the nature described, the well structure is left in a clean condition, thus avoiding extensive clean-out operations.

The present invention may be practiced with numerous modifications without departing from the spirit and scope thereof. Thus, it is contemplated that the fracturing liquid may be pumped into the well at a pressure below the incipient breakdown pressure of the formation and the formation then cracked or fractured by the pressure released by reacting the propellant in the body of fracturing liquid, the propellant furnishing the additional pressure required to fracture the formation.

Also, it is contemplated that the formation to be fractured may be weakened such as by underreaming or gun perforating followed by the reaction of the propellant to cause the actual fracturing. It is to be understood, however, that while I mention underreaming and gun perforating as means to weaken the formation, the two are not equivalent since the former increases the diameter of the hole while the latter causes the formation of paths for the fracturing liquid to follow when it is forced into the formation by the propellant reacting.

While the fracturing liquid is conveniently arranged adjacent the formation, actually it is desirable that it extend a considerable distance up the hole above the formation to be fractured. In this connection, the propellant may be spotted at any point in an open hole or casing in the fracturing liquid to force fracturing liquid into the formation to fracture same. Thus, the propellant may be located adjacent, above or below the formation which is to be fractured.

The nature and objects of the present invention having been completely described and illustrated, what I wish to claim as new and useful and to secure by Letters Patent is:

1. A method for fracturing a subsurface earth formation of low permeability penetrated by a well bore comprising pumping a liquid into said well bore adjacent said formation until a pressure just below the incipient breakdown pressure of said formation is imposed on said liquid located adjacent said formation, maintaining said pressure on said liquid, exploding a low propellant explosive charge in said liquid adjacent said formation thereby generating a pressure on said liquid above the incipient breakdown pressure of the said formation to force said liquid into said formation to form fractures therein, pumping additional liquid into said formation, releasing said pressure on said liquid, and producing said formation.

2. A method as recited in claim 1 wherein said liquid contains a propping agent.

3. A method as recited in claim 1 in which the propellant is black powder.

4. A method as recited in claim 1 in which the propellant comprises potassium perchlorate and asphalt.

5. A method as recited in claim 1 in which the propellant comprises nitrocellulose, nitroglycerine, diethyldiphenyl urea, and diphenyl amine.

6. A method as recited in claim 1 in which the propellant comprises perchloric acid and a hydrocarbon.

7. A method as recited in claim 1 in which the propellant comprises hydrogen peroxide and a hydrocarbon.

References Cited in the file of this patent

UNITED STATES PATENTS

| | | |
|---|---|---|
| Re. 4,770 | Noble | Feb. 27, 1872 |
| 2,379,516 | Garrison | July 3, 1945 |
| 2,452,654 | Haynes et al. | Nov. 2, 1948 |
| 2,547,778 | Reistle | Apr. 3, 1951 |
| 2,676,662 | Ritzmann | Apr. 27, 1954 |
| 2,712,355 | Hoff | July 5, 1955 |

OTHER REFERENCES

"Horizons," November-December 1951, published by Stanolind Oil and Gas Company, pages 1–3 inclusive.